(12) United States Patent
Vlahovic

(10) Patent No.: US 7,431,382 B2
(45) Date of Patent: Oct. 7, 2008

(54) AIR GUIDING SYSTEM FOR A VEHICLE

(75) Inventor: Josip Vlahovic, Freiberg am Neckar (DE)

(73) Assignee: Dr. Ing. h.c.F. Porsche Aktiengesellschaft, Stuttgart (DE)

( * ) Notice: Subject to any disclaimer, the term of this patent is extended or adjusted under 35 U.S.C. 154(b) by 0 days.

(21) Appl. No.: 11/727,612

(22) Filed: Mar. 27, 2007

(65) Prior Publication Data

US 2007/0228774 A1    Oct. 4, 2007

(30) Foreign Application Priority Data

Mar. 28, 2006    (DE)    ................. 10 2006 014 258

(51) Int. Cl.
*B62D 37/02*    (2006.01)

(52) U.S. Cl. ................. 296/180.5; 180/903; 296/26.12; 296/180.1

(58) Field of Classification Search ................. 105/1.3; 180/903; 244/213; 296/26.01, 26.12, 26.13, 296/180.1, 180.2, 180.3, 180.4, 180.5
See application file for complete search history.

(56) References Cited

U.S. PATENT DOCUMENTS

| | | | | |
|---|---|---|---|---|
| 1,274,986 A | * | 8/1918 | Carolin | 244/213 |
| 1,762,002 A | * | 6/1930 | De Putte | 244/213 |
| 3,791,468 A | * | 2/1974 | Bryan, Jr. | 180/69.2 |
| 4,773,692 A | * | 9/1988 | Schleicher et al. | 296/180.5 |
| 4,925,236 A | * | 5/1990 | Itoh et al. | 296/180.5 |
| 5,013,081 A | * | 5/1991 | Cronce et al. | 296/180.1 |
| 5,120,105 A | * | 6/1992 | Brin et al. | 296/180.5 |
| 5,536,062 A | * | 7/1996 | Spears | 296/180.3 |
| 6,382,708 B1 | * | 5/2002 | Erdelitsch et al. | 296/180.5 |
| 6,672,651 B1 | * | 1/2004 | Shuen | 296/180.5 |
| 7,322,638 B2 | * | 1/2008 | Larson | 296/180.1 |
| 2002/0074826 A1 | * | 6/2002 | Presley | 296/180.1 |
| 2007/0001482 A1 | | 1/2007 | Larson | |

FOREIGN PATENT DOCUMENTS

| | | |
|---|---|---|
| DE | 30 19 150 A1 | 11/1981 |
| DE | 43 05 090 A1 | 8/1994 |
| DE | 10 2004 030 571 A1 | 1/2006 |

(Continued)

OTHER PUBLICATIONS

German Office Action dated Dec. 4, 2006 with English translation (Six (6) Pages).

*Primary Examiner*—D. Glenn Dayoan
*Assistant Examiner*—Paul A Chenevert
(74) *Attorney, Agent, or Firm*—Crowell & Moring LLP

(57) ABSTRACT

A vehicle air guiding system in a rear area of the vehicle has a central air guiding element displaceable between a moved-in inoperative position into a moved-out operative position. Lateral air guiding elements, which are displaceable together with the central air guiding element, are telescopically displaceable relative to the central air guiding element while enlarging the transverse dimension of the air guiding system transversely to vehicle longitudinal direction from an also moved-in inoperative position into an also moved-out operative position. In the inoperative position, the lateral air guiding elements are pushed over the central air guiding element so that they rest against one another by way of the end sections and completely cover or envelop the central air guiding element.

8 Claims, 1 Drawing Sheet

FOREIGN PATENT DOCUMENTS

| | | | | |
|---|---|---|---|---|
| EP | 271757 A2 * | 6/1988 | ................. | 244/46 |
| EP | 1 738 996 A2 | 1/2007 | | |
| JP | 60163773 A * | 8/1985 | ............. | 296/180.5 |
| JP | 03 000 578 A * | 1/1991 | .............. | 296/180.1 |
| JP | 03 281484 A * | 12/1991 | .............. | 296/180.1 |

* cited by examiner

AIR GUIDING SYSTEM FOR A VEHICLE

CROSS REFERENCE TO RELATED APPLICATIONS

This application claims the benefit of priority under 35 U.S.C. § 119 to German Patent Application No. 10 2006 014 258 filed Mar. 28, 2006, the disclosure of which is incorporated herein by reference in its entirety.

BACKGROUND AND SUMMARY OF THE INVENTION

The present invention relates to an air guiding system for a vehicle which is arranged in a rear area of the vehicle and comprises a central air guiding element, which can be displaced from a moved-in inoperative position into a moved-out operative position and vice-versa, lateral air guiding elements being displaceable together with the central air guiding element, and the lateral air guiding elements being telescopically displaceable relative to the central air guiding element while enlarging the transverse dimension of the air guiding system transversely to the longitudinal direction of the vehicle from an also moved-in inoperative position into an also moved-out operative position.

DE 30 19 150 A1 shows a vehicle air guiding system arranged in an upper rear area of the vehicle and having an air guiding element that can be displaced from an inoperative position, in which it is integrated in the shaping of the rear area flush with the surface, into a moved-out operative position. The air guiding element is constructed as an aerofoil which, by way of an operating device, can be displaced or changed from the inoperative position into the operative position and vice-versa.

DE 43 05 090 A1 also discloses a vehicle air guiding system arranged in a rear area of the vehicle and having an air guiding element that can be displaced from an inoperative position into a moved-out operative position. The air guiding element is formed by a rear spoiler arranged in a recessed receiving device of the vehicle body and displaced by an operating device from the inoperative position to the operative position and vice-versa.

The air guiding systems disclosed in the above-mentioned DE 30 19 150 A1 and DE 43 05 090 A1 increase the vehicle rear axle output coefficient ($c_{ah}$-value) while maintaining the drag coefficient ($c_w$-value) at the same level or improving same. These known air guiding elements each having the same transverse dimension in the inoperative position and in the operative position.

DE 10 2004 030 571 A1 discloses a vehicle air guiding system having a central air guiding element as well as two lateral air guiding elements. The lateral air guiding elements allow the transverse dimension of the air guiding system can be enlarged in the operative position. The lateral air guiding elements can be telescopically moved with respect to the central air guiding element, in the moved-in inoperative position, the lateral air guiding elements enveloping the end areas of the central guiding element in a cap-type manner while forming visually and aerodynamically negative step-type shoulders.

An object of the present invention is to provide an improved vehicle air guiding system in which, in the inoperative position of the lateral air guiding elements, the latter are pushed over the central air guiding element so as to rest against one another by way of end sections and completely cover or envelop the central air guiding element.

Preferably the lateral air guiding elements can be changed isochronously or simultaneously with the displacement of the central air guiding element from the inoperative position into the operative position with respect to the central air guiding element from an also moved-in inoperative position into an also moved-out operative position.

Other objects, advantages and novel features of the present invention will become apparent from the following detailed description of the invention when considered in conjunction with the accompanying drawings.

DETAILED DESCRIPTION OF THE DRAWING

Figure 1:
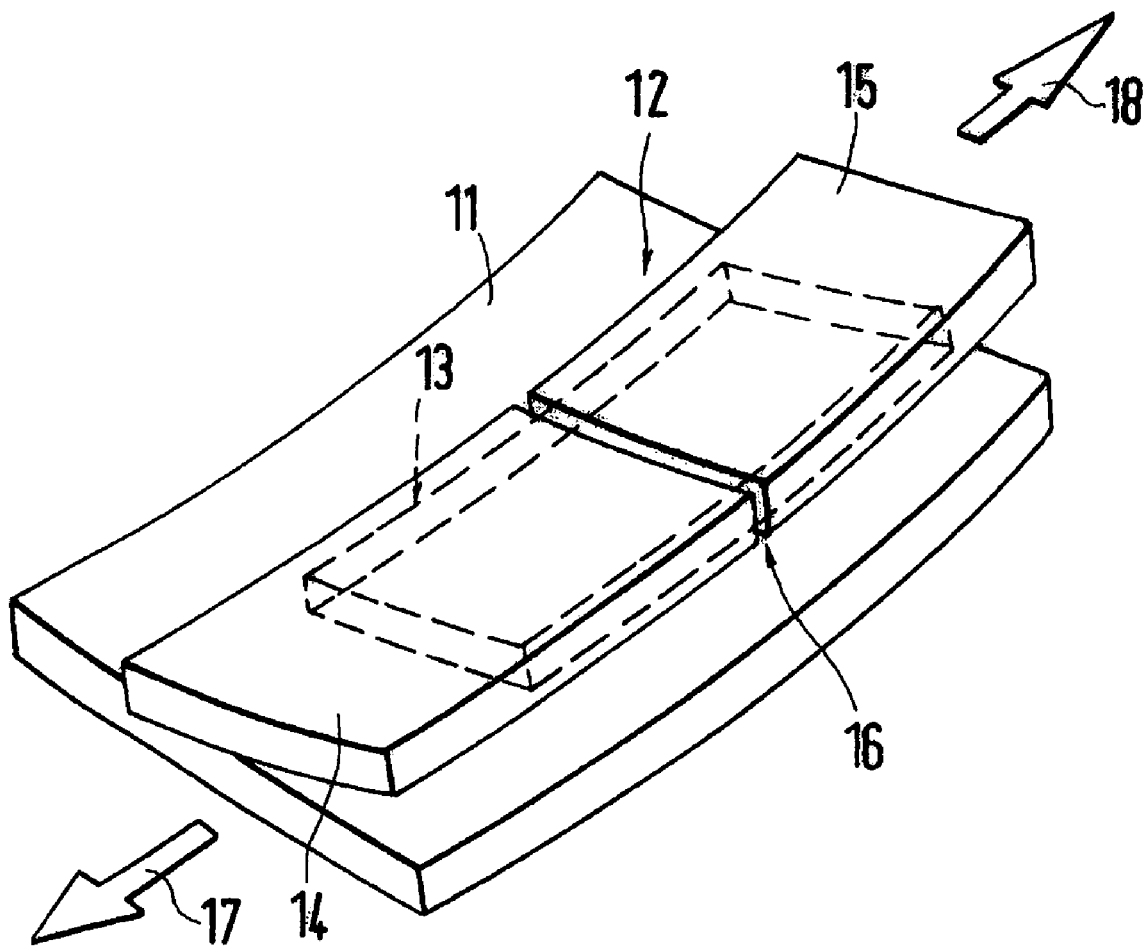
FIG. 1 is a schematic representation of an air guiding system according to the invention in perspective view.

FIG. 1 shows a cutout of a motor vehicle rear area 10, namely a vehicle body part 11 as well as an air guiding system designated generally by numeral 12 of the rear area 10. In a moved-in inoperative position, the air guiding system 12 is integrated flush with the surface in the rear area 10 of the motor vehicle. In contrast, in a moved-out operative position, the air guiding system 12 is moved out of the surface contour of the rear area 10.

The air guiding system 12 according to the invention has a central air guiding element 13 (shown in dash lines) as well as two lateral air guiding elements 14, 15. In the illustrated position in FIG. 1, the lateral air guiding elements 14, 15 completely cover or envelop the central air guiding element 13.

Thus, in the illustrated position, the lateral air guiding elements 14, 15 rest against one another by way of end sections while forming a separating gap 16. When the lateral air guiding elements 14, 15 are changed from the inoperative position illustrated in FIG. 1 into a moved-out operative position, the lateral air guiding elements 14, 15 can be moved in the direction of the arrows 17, 18 respectively, transversely to the longitudinal direction of the vehicle while enlarging the distance between the end sections and thus while enlarging the separating gap 16, with the central air guiding element 13 being exposed at least in sections.

The change of the air guiding system 12 according to the present invention from an inoperative position into an operative position takes place such that the entire air guiding system 12 (thus the central air guiding element 13 together with the lateral air guiding elements 14, 15) is moved out of the surface contour of the rear area 10 as a result of an upward-directed movement, preferably by an upward-directed swinging motion. Preferably isochronously or simultaneously with this displacement, the lateral air guiding elements 14, 15 are telescopically displaced with respect to the central air guiding element 13 linearly or translatorily in the direction of the arrows 17, 18 respectively and thus transversely to the longitudinal direction of the vehicle. Thereby the transverse dimension of the air guiding system 12 is enlarged according to the invention. As mentioned above, the central air guiding element 13 is thereby exposed at least in sections.

Also mentioned above, isochronously with the displacement of the central air guiding element 13 from the inoperative position into the operative position and vice-versa from the operative position into the inoperative position, the displacement of the lateral air guiding elements 14, 15 with respect to the central air guiding element 13 takes place from an also moved-in inoperative position into an also moved-out operative position or vice-versa from the operative position into the inoperative position. Here, it is noted that these two displacements may, however, also be carried out independently or uncoupled from one another. In this case, preferably first the central air guiding element 13 together with the lateral air guiding elements 14, 15 while maintaining the relative position to one another is displaced, and only subsequently, the displacement of the lateral air guiding elements 14, 15 with respect to the central air guiding element 13 takes place transversely to the longitudinal direction of the vehicle.

The air guiding system 12 according to the invention has the advantage that, in the inoperative position, in which the lateral air guiding elements 14, 15 cover or envelop the central air guiding element 13 completely, no visually or aerodynamically negative shoulder is formed between the lateral air guiding elements 14 and 15 and the central air guiding element 13.

For the displacement or moving of the lateral air guiding elements 14, 15 relative to the central air guiding element 13 transversely to the longitudinal direction of the vehicle, a single drive is sufficient which is preferably constructed as a spindle-shaped linear drive.

It is another advantage of the air guiding system 12 according to the invention that, as a result of the considerable overlapping of the lateral air guiding elements 14, 15 with the central air guiding element 13, which occurs in their inoperative position as well as in their operative position, aerodynamic forces are reliably transmitted to the central air guiding element 13. The lateral air guiding elements 14 and 15 are therefore subjected to relatively low stress, so that they can easily have a relatively light and thin-walled construction.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A vehicle air guiding system, arranged in a vehicle rear area comprising a central air guiding element displaceable between a moved-in inoperative position into a moved-out operative position, and lateral air guiding elements displaceable together with the central air guiding element and telescopically displaceable relative to the central air guiding element while enlarging the transverse dimension of the air guiding system transversely to a longitudinal direction of the vehicle from an also moved-in inoperative position into an also moved-out operative position, wherein in the inoperative position the lateral air guiding elements are pushed over the central air guiding element to rest against one another by way of the end sections and completely envelop all sides of the central air guiding element.

2. The vehicle air guiding system according to claim 1, wherein when changing the lateral air guiding elements from the moved-in inoperative position into the moved-out operative position, the lateral air guiding elements are movable transversely to the longitudinal direction of the vehicle while enlarging the distance between the end sections and while exposing the central air guiding element at least in sections.

3. The vehicle air guiding system according to claim 1, wherein the end sections of the lateral air guiding elements contact one another while forming a separating gap that is enlargeable in the also moved out operative position.

4. The vehicle air guiding system according to claim 3, wherein when changing the lateral air guiding elements from the moved-in inoperative position into the moved-out operative position, the lateral air guiding elements are movable transversely to the longitudinal direction of the vehicle while enlarging the distance between the end sections and while exposing the central air guiding element at least in sections.

5. The vehicle air guiding system according to claim 1, wherein the lateral air guiding elements are arranged to be changed, isochronously or simultaneously from the also moved-in inoperative position into the also moved-out operative position with displacement of and with respect to the central air guiding element from the inoperative position into the operative position.

6. The vehicle air guiding system according to claim 5, wherein in the moved-in inoperative position, the end sections of the lateral air guiding elements contact one another while forming a separating gap that is enlargeable in the also moved out operative position.

7. The vehicle air guiding system according to claim 5, wherein when changing the lateral air guiding elements from the moved-in inoperative position into the moved-out operative position, the lateral air guiding elements are movable transversely to the longitudinal direction of the vehicle while enlarging the distance between the end sections and while exposing the central air guiding element at least in sections.

8. The vehicle air guiding system according to claim 7, wherein in the moved-in inoperative position, the end sections of the lateral air guiding elements contact one another while forming a separating gap that is enlargeable in the also moved out operative position.

* * * * *

UNITED STATES PATENT AND TRADEMARK OFFICE
CERTIFICATE OF CORRECTION

PATENT NO. : 7,431,382 B2 Page 1 of 1
APPLICATION NO. : 11/727612
DATED : October 7, 2008
INVENTOR(S) : Josip Vlahovic It is certified that error appears in the above-identified patent and that said Letters Patent is hereby corrected as shown below:

In column 4, claim 3, line 13, after the word "wherein", please insert --in the moved-in inoperative position,--.

Signed and Sealed this

Fourteenth Day of July, 2009

JOHN DOLL
*Acting Director of the United States Patent and Trademark Office*